April 8, 1952     S. GILBERT     2,592,271
ENGINE STARTER
Filed Feb. 25, 1949
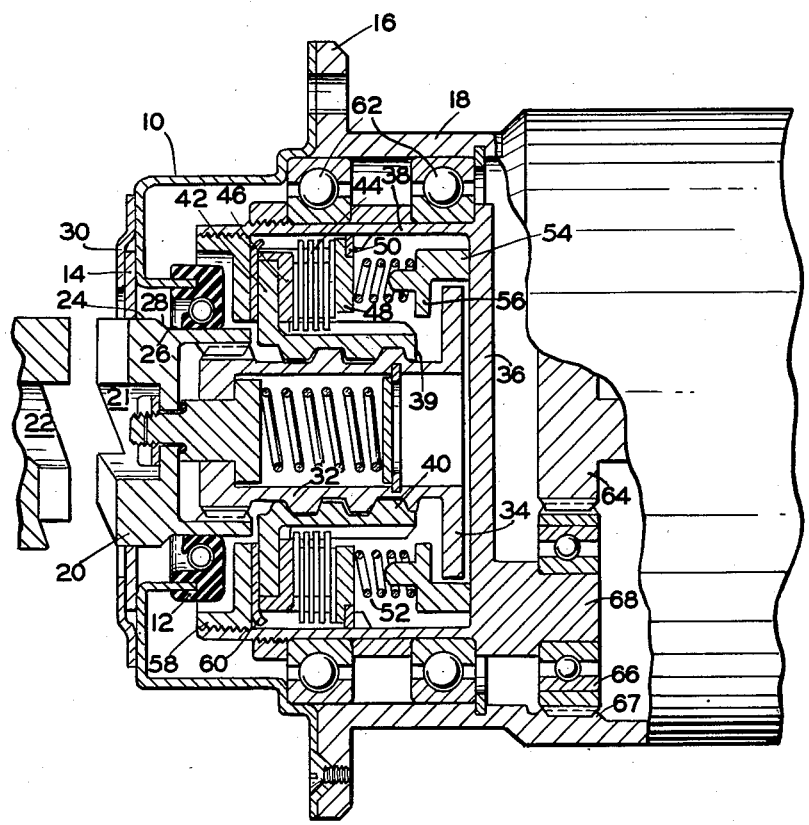
INVENTOR.
SAMUEL GILBERT
BY
-ATTORNEY- Patented Apr. 8, 1952

2,592,271

UNITED STATES PATENT OFFICE 2,592,271

ENGINE STARTER

Samuel Gilbert, Cedar Grove, N. J., assignor to Bendix Aviation Corporation, Teterboro, N. J., a corporation of Delaware Application February 25, 1949, Serial No. 78,379

5 Claims. (Cl. 123—179)

The present invention relates to engine starters and more particularly to clutch mechanism for starters for aircraft engines.

In starters of this type it has been impracticable to bring the starter jaw into engagement with the engine jaw prior to the application of cranking power, and the sudden application of power during engagement of such starters with the engine imposes a severe shock load on the starter mechanism and mating jaws, and consequently the parts affected have been made much more rugged and heavier than necessary for just cranking the engine. The useful life of such starters could be substantially lengthened and the size and weight thereof could be materially reduced if this shock load could be eliminated.

Means have been proposed in a starter having a rotatable barrel and a concentric shell driven by the barrel through a friction clutch for increasing the friction setting of the friction clutch by moving the shell relative to the barrel as the starter jaw advances, but the practical disadvantages of such a system is the difficulty of maintaining a constant torque limiting value for the clutch during cranking operation and of preventing the warping of the friction elements during the relative movement of the parts interconnected by the clutch.

One object of the present invention is to provide novel means in an engine starter whereby the shock loading referred to above is reduced to a negligible value.

Another object of the present invention is to provide a simple, reliable, effective and novel starter adapted to engage a member of the engine to be started and then gradually apply the cranking torque.

Another object of this invention is to provide means in a starter of the type having a rotatable barrel driving a long thread nut through a friction clutch whereby the friction setting of the friction clutch is gradually increased as the starter jaw moves into engagement with the engine jaw without relative axial movement of the barrel and the nut.

The above and other objects and features of the invention will appear more fully hereinafter from a consideration of the following description taken in connection with the accompanying drawing wherein one embodiment of the invention is illustrated by way of example.

Referring to the drawing in which the single figure is a side view, generally in section but having parts in elevation, of a portion of an engine starter embodying the invention, an annular baffle 10 supporting an oil seal 12 and a split ring 14 is secured to a flange 16 of starter housing 18 by screws as shown. A starter jaw member 20 having jaws 21 is adapted to move axially into driving engagement with a mating engine jaw member 22 and is provided with cylindrical shank portions 24 and 26, the latter having a lesser diameter, joined by a ramp 28. Oil seal 12 surrounds jaw portion 26 in sealing engagement therewith but permitting axial and rotative movements thereof. Split ring 14, which may be of a material such as Phosphor bronze or the like is held in frictional engagement against shank portion 24 so as to resist rotation but permitting axial movement thereof, by annular ring 30 welded or otherwise secured to baffle 10. This specific clamping and sealing arrangement forms no part of the present invention but is referred to in order to describe a complete operative device embodying the invention, and is described in detail and claimed in the copending application for U. S. Patent No. 709,272 filed November 12, 1946 by Mr. Charles S. Metsger and assigned to the same assignee as the present application, now U. S. Patent 2,505,563.

Jaw member 20 is internally splined to screw shaft 32 which is terminated in an outwardly extending flange portion 34 adjacent the wall portion 36 of rotatable barrel 38. Surrounding screw shaft 32 is an axially stationary rotative nut 40 having an outwardly extending flange portion 42. A disc pack 44, having discs alternately splined to barrel 39 and nut 44, is assembled between backing plate 46 and pressure plate 48. The backing plate 46 abuts the flange portion 42 of the nut 40 and a snap ring 50 positioned in an internal annular groove in the barrel 38 retains the pressure plate 48 in contact with the disc pack 44. A plurality of circumferentially spaced springs 52 are confined between annular ring member 54 surrounding flange portion 34 of screw 32 and backing plate 48 and exert a slight pressure on backing plate 48 splined to the barrel 38 thereby giving the disc pack 44 an initial friction setting of relatively low torque transmitting capacity. Annular ring member 54 is provided with an inwardly extending flange portion 56 arranged so as to abut flange portion 34 when screw shaft 32 has moved a short distance to the left as viewed in the drawing. Ring nut 58 engages internal threads on barrel 38 to hold nut 40 axially stationary, and plate 60 interposed between flange 42 and ring nut 58 and splined to the barrel provides the thrust bearing for the nut 40. Barrel 38 is rotatably journaled in housing 18 by a pair of ball bearings 62, and driven from a motor output pinion 64 driving one or more planet gears 66 meshing with and revolving within orbit gear 67 and journaled on a trunnion 68 shown as an integral portion of wall 36 of barrel 38.

In operation, the starter motor drives the barrel 38 through output pinion 64, orbit gear 67 and planet gear 66. The force exerted by spring 52 against pressure plate 48 pressing the discs of disc pack 44 together gives the disc pack sufficient torque transmitting capacity to rotate nut 40 and thereby forcing screw shaft 32 and jaw member 20 to the left as viewed in the drawing. The screw shaft and jaw member are kept from rotating by the friction of split ring 14 acting against shank portion 24 of jaw member 20.

The flanges 34 and 56 of screw shaft 32 and ring member 54 respectively are arranged so as to abut as soon as jaws 21 of jaw member 20 engage the corresponding jaws of engine jaw member 22. Further movement to the left of screw shaft 32 will move ring member 54 away from end wall 36 of barrel 38 and compress springs 52 thereby gradually increasing the friction value between the individual discs of disc pack 44 until the jaw members are completely meshed and flange 34 is brought up against the flat end portion 39 of nut 40 when the cranking operation commences. In the meantime, split friction ring 14 has ridden off shank portion 24 down ramp 28 so as to free the jaw member 20 for rotation. Thus it is seen that as the jaws are brought into engagement, the friction value and hence the torque transmitting capacity is increased from a low value just sufficient to operate the jaw advancing mechanism to the maximum predetermined torque limiting value when flange 34 abuts end wall 39. By this arrangement the mating jaw members are eased into engagement without the resulting shock loading which occurs in starters provided with a preset torque limiting clutch between the revolving barrel and the jaw advancing mechanism. It should be noted that by this particular construction the torque limiting value of disc pack 44 may be designed to a predetermined fixed maximum and as the springs 52 are compressed proportionally to torque output or requirement during cranking, the torque limiting value of the disc pack will vary up to a maximum required to accelerate the engine. By employing this invention, it is possible to use motors runnings at higher speeds than has heretofore been possible, and due to the elimination of the shock loading of the starter, such parts as the jaw members, the screw shaft 32 and the nut 40 may be made of lighter construction and are less subject to wear. It should also be noted that by maintaining the barrel and the nut axially stationary relative to each other the discs of the disc pack are not subject to binding and warping which would be the case if the friction setting of the clutch were changed by moving either the barrel or the nut relative to the other.

Although only one embodiment of the invention has been illustrated and described, various changes in the form and relative arrangements of the parts may be made to suit requirements.

What is claimed is:

1. In an engine starter, a drive including a rotatable driving barrel, an axially stationary rotatable nut arranged concentric within the barrel, a friction clutch forming the torque transmitting connection between the barrel and the nut, a driving member mounted within and actuated by the nut for longitudinal movement into engagement with a member of the engine to be started and for rotary movement to crank the engine, said driving member having a radially extending projection thereon, and means independent of relative motion of said barrel and said nut interposed in the path of longitudinal movement of the driving member to engage said projection and apply a gradually increasing pressure to such clutch.

2. In an engine starter, the combination with a driving barrel, a driven nut axially stationary relative to said barrel, a disc pack having a normally low friction setting forming the driving connection between said barrel and said nut and a screw shaft driven from said nut axially to advance a starter jaw into engagement with and rotatably to crank an engine to be started; of an outwardly extending flange portion on the screw shaft at the end thereof trailing when said screw shaft moves longitudinally toward the engine to be started, of a ring member surrounding said flange member and having an inwardly directed flange member adapted to be engaged by said outwardly extending flange member; approximately when said starter jaw reaches the engine jaw, spring means interposed between said ring member and said disc pack and adapted to bear against the discs of said disc pack to control the friction setting thereof.

3. In an engine starter having a driving barrel, a rotatably driven nut concentrically arranged within said driving barrel and axially stationary relative thereto, a torque limiting disc pack of normally low friction setting having discs alternately splined to said barrel and said nut, a screw shaft connected to a starter jaw adapted to be moved by said nut longitudinally to move said starter jaw into engagement with a mating jaw of the engine to be started and rotatably to crank it; the combination of means including a flange on said screw shaft to gradually increase the friction setting of said disc pack as said shaft moves longitudinally from its retracted position to the position of full engagement of the starter jaw with the engine jaw.

4. In an engine starter, a driving barrel, a rotatably driven nut concentrically arranged within said driving barrel and axially stationary relative thereto, a torque limiting disc pack of normally low friction setting having discs alternately splined to said barrel and said nut, a screw shaft connected to a starter jaw adapted to be moved by said nut longitudinally to move said starter jaw into engagement with a mating jaw of the engine to be started and rotatably to crank it, and means including a radial flange on said screw shaft to vary the friction setting of the disc pack in accordance with the axial position of said screw shaft relative to said nut.

5. In an engine starter having a driving barrel, a rotatably driven nut concentrically arranged within said driving barrel and axially stationary relative thereto, a torque limiting disc pack of normally low friction setting having discs alternately splined to said barrel and said nut, and a screw shaft connected to a starter jaw adapted to be moved by said nut; the combination of a ring member having a radially inwardly extending portion, spring means interposed between said ring member and said torque limiting disc pack and adapted to control the torque transmitting capacity of said disc pack, and a radially outwardly extending member secured to the other end of said screw shaft and adapted to engage said inwardly extending portion of said ring member when moving from its retracted position to its extended position so as to compress said spring and thereby increase the friction setting of said disc pack as the starter jaw is moved into engagement with the engine jaw.

SAMUEL GILBERT.

REFERENCES CITED

The following references are of record in the file of this patent:

UNITED STATES PATENTS

| Number | Name | Date |
| --- | --- | --- |
| 2,038,182 | Linder | Apr. 1, 1936 |
| 2,331,077 | Nardone | Oct. 5, 1943 |